United States Patent [19]
Tran

[11] Patent Number: 6,167,512
[45] Date of Patent: Dec. 26, 2000

[54] DYNAMIC CREATION OF ACPI APIC TABLES USING MP SPECIFICATION

[75] Inventor: Andrew Tuan Tran, Milpitas, Calif.

[73] Assignee: Phoenix Technologies, Ltd., San Jose, Calif.

[21] Appl. No.: 09/163,357

[22] Filed: Sep. 30, 1998

[51] Int. Cl.[7] .................................................. G06F 9/445
[52] U.S. Cl. ............................... 713/2; 710/48; 710/262; 710/266
[58] Field of Search ..................... 713/1, 2, 100; 710/260, 264, 48, 266, 265, 263, 9; 395/490

[56] References Cited

U.S. PATENT DOCUMENTS

| | | | |
|---|---|---|---|
| 5,481,725 | 1/1996 | Jayakumar et al. | 710/265 |
| 5,495,569 | 2/1996 | Kotzur | 714/2 |
| 5,511,200 | 4/1996 | Jayakummar | 710/265 |
| 5,619,705 | 4/1997 | Karnik et al. | 710/266 |
| 5,634,038 | 5/1997 | Saitoh | 395/490 |
| 5,634,075 | 5/1997 | Smith et al. | 395/829 |
| 5,724,527 | 3/1998 | Karnik et al. | 710/128 |
| 5,727,217 | 3/1998 | Young | 710/260 |
| 5,903,894 | 5/1999 | Reneris | 707/100 |
| 5,913,045 | 6/1999 | Gillespie et al. | 710/129 |
| 5,937,200 | 8/1999 | Frid et al. | 710/264 |
| 5,938,765 | 8/1999 | Dove et al. | 713/1 |
| 5,987,538 | 11/1999 | Tavallaei et al. | 710/48 |
| 5,999,730 | 6/1999 | Lewis | 717/2 |

*Primary Examiner*—Thomas C. Lee
*Assistant Examiner*—Rijue Mai
*Attorney, Agent, or Firm*—Foley & Lardner

[57] ABSTRACT

A method and system for dynamic creation of APIC tables under the ACPI specification using existing APIC tables under the MP specification in a multi-processor computer. The method of the present invention provides for the dynamic creation of APIC entries in a computer memory, and includes the steps of: scanning the memory for an MP APIC header, reading MP APIC entries from a location in the memory indicated by the MP APIC header, building ACPI APIC entries in the memory from at least a portion of the MP APIC entries read, and updating an ACPI APIC header in the memory after the ACPI APIC entries have been built.

24 Claims, 4 Drawing Sheets

DYNAMIC CREATION OF ACPI APIC TABLES USING MP SPECIFICATION

FIELD OF THE INVENTION

The invention relates to the creation of APIC entries in the memory of a computer. Specifically, the present invention relates to the dynamic creation of APIC entries under the ACPI specification in the memory of a multi-processor computer, preferably during the power-on self test (POST) procedure, based upon existing APIC entries under the MP specification.

BACKGROUND OF THE INVENTION

Upon a start-up of a multi-processor computer, or after a reset, first the primary CPU starts and checks whether there are additional processors. If so, it then enables those processors, thus enabling their respective local Advanced Programmable Interrupt Controllers (APICs). The input/output (I/O) APIC, to which the local APICs are connected, is also enabled. Collectively, the local APICs and the I/O APIC are responsible for delivering interrupts from sources to destinations within the multi-processor system. The I/O APIC specifically interfaces with the peripherals which issue hardware interrupts, and distributes the external interrupts according to a preprogrammed interrupt scheme to the local APICs.

When the operating system for such a multi-processor computer is upgraded, specifically when a version of an operating system for a multi-procesor computer based on the Advanced Configuration and Power Interface (ACPI) specification, as developed by Intel, Microsoft and Toshiba, replaces one based on the Intel MultiProcessor (MP) specification, various hardware specific configurations in the BIOS must be revised in order for the new system to function properly. Multi-processor system compliance with the ACPI specification requires that new tables be created to indicate how the system interrupts are wired. On the part of the deployment engineer, this requires knowledge of the specific hardware layout and how the I/O APIC and local APICs operate. Creation of such tables manually can be very time consuming for an engineer charged with deployment of the newer operating system on his customer's hardware and can be expensive for the customer. There is also a substantial likelihood of human-error and an increased necessity for providing customer support.

SUMMARY OF THE INVENTION

Having identified the above described problems, the inventor had developed the following solution, which is embodied in the present invention. As described herein, the present invention provides for the dynamic creation of APIC entries under the ACPI specification in the memory of a multi-processor computer, based upon existing APIC entries under the MP specification. The invention allows for ACPI APIC entries to be created accurately and efficiently with minimal involvement of the deployment engineer. The invention utilizes the previous engineering effort placed in creating the APIC entries conforming to the MP specification. It does so by taking advantage of certain similarities between the MP and ACPI specification to build ACPI entries directly from existing MP entries. In this way, configurations such as I/O interrupt routing need not be created from scratch. The required tables are built and combined automatically and dynamically. The information reflects the actual customer system configuration. With the present invention, the deployment engineer need not know much about the customer's I/O APIC and what it requires. The invention saves the engineer's time, reduces the possibility of human error, reduces the need for customer support, and reduces costs.

The method of the present invention provides for the dynamic creation of APIC entries in a computer memory, and includes the steps of: scanning the memory for an MP APIC header, reading MP APIC entries from a location in the memory indicated by the MP APIC header, building ACPI APIC entries in the memory from at least a portion of the MP APIC entries read, and updating an ACPI APIC header in the memory after the ACPI APIC entries have been built.

In a further aspect of this embodiment of the present invention, ACPI APIC entries are built by: scanning the MP APIC entries to obtain an ISA bus ID; determining from the MP APIC header the total number of MP APIC entries; determining the MP entry type for one of the MP APIC entries; building, in a computer readable memory area, a local ACPI APIC entry based upon the information in the MP APIC entry if the MP APIC entry is of a processor type; building, in the computer readable memory area, an I/O ACPI APIC entry based upon the information in said MP APIC entry if said MP APIC entry is of an I/O APIC type; building, in said third computer readable memory area, an interrupt source override ACPI entry based upon the information in said MP APIC entry if the MP APIC entry is of an I/O interrupt type and is maskable, if a source bus ID of the MP APIC entry is equivalent to the ISA bus IRQ and if the source bus ID is different than the destination I/O APIC INTIN# of the MP APIC entry; building, in the computer readable memory area, an ACPI NMI entry based upon the information in the MP APIC entry if the MP APIC entry is of an I/O interrupt type and is non-maskable; and repeating for each of the MP APIC entries.

The multi-processor computer system of the present invention in which APIC entries are dynamically created comprises a memory containing MP APIC entries including an MP APIC header and a processor for reading at least a portion of the MP APIC entries and building corresponding ACPI APIC entries in the memory.

The computer readable medium of the present invention provides for the dynamic creation of APIC entries in a computer memory, and includes a first computer readable code for scanning the memory for an MP APIC header, a second computer readable code for reading MP APIC entries from a location in the memory indicated by the MP APIC header, a third computer readable code for building ACPI APIC entries in the memory from at least a portion of said MP APIC entries, and a fourth computer readable code for updating an ACPI APIC header in the memory.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE PREFERRED EMBODIMENTS

Figure 1:
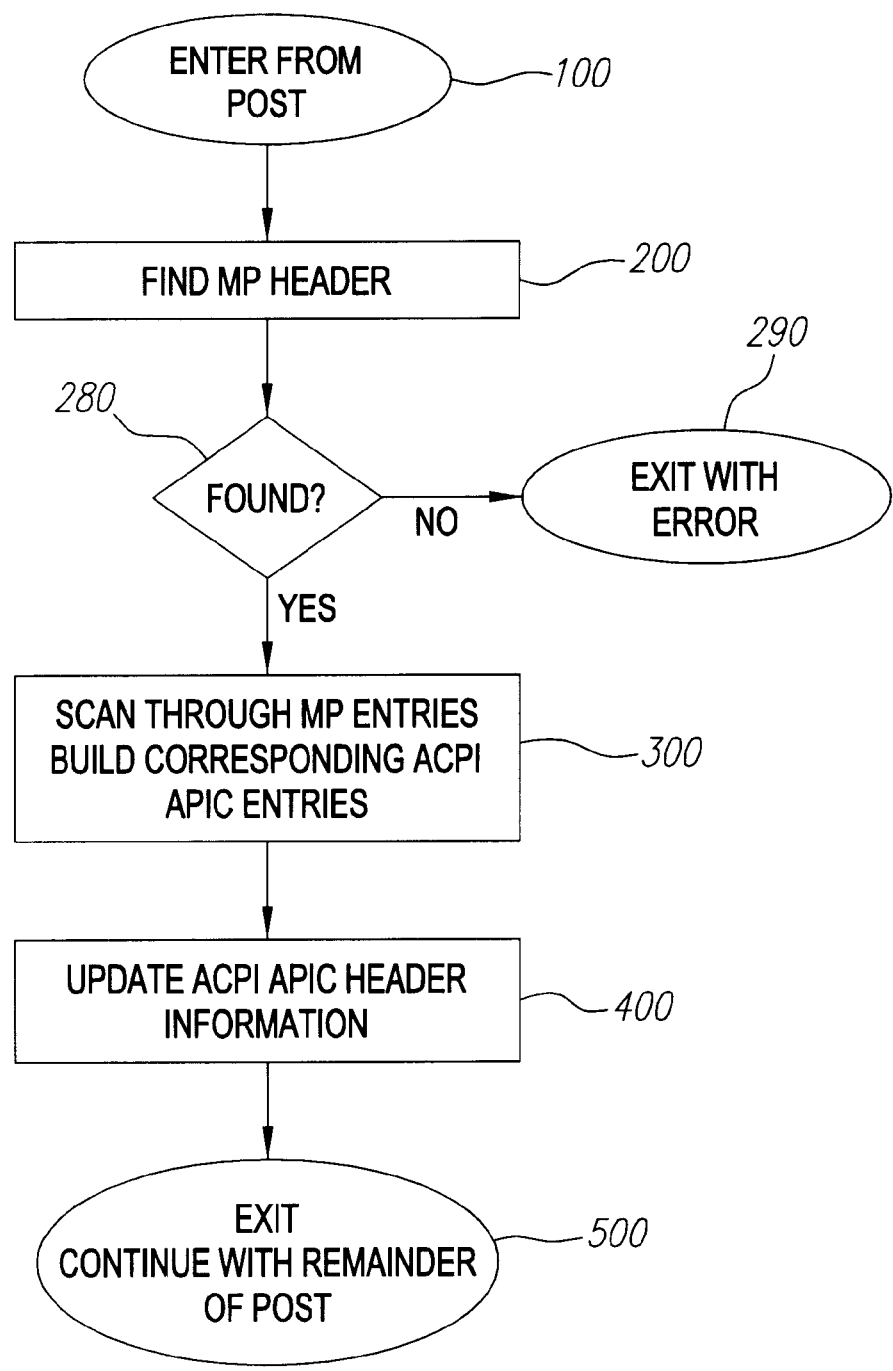
FIG. 1 is a flowchart illustrating an overview of the operation of the present invention.

As described with reference to the accompanying drawings and the tables reproduced herein, the present invention provides a method and system for dynamic creation of APIC tables under the ACPI specification using existing APIC tables under the MP specification in a multi-processor computer.

When an operating system is upgraded, specifically when a version of an operating system for a multi-processor computer based on the ACPI specification replaces one based on the MP specification, various hardware specific configurations in the BIOS must be revised in order for the new system to function properly. Multi-processor system compliance with the ACPI specification requires that new tables be created to indicate how the system interrupts are wired. This requires knowledge of the specific hardware layout and how the I/O APIC and local APICs operate. Creation of such tables can be very time consuming for an engineer charged with deployment of the newer operating system on his customer's hardware and can be expensive for the customer.

As discussed herein, the present invention allows ACPI APIC entries to be created accurately and efficiently with minimal involvement of the deployment engineer. The invention utilizes the previous engineering effort expended in creating the APIC entries conforming to the MP specification. It does so by taking advantage of certain similarities between the MP and ACPI specifications to build ACPI entries directly from existing MP entries. In this way, configurations such as I/O interrupt routing need not be created from scratch. The required tables are built and combined automatically and dynamically. The information reflects the actual customer system configuration. With the present invention, the deployment engineer need not know much about the customer's I/O APIC and what it requires. The invention saves the engineer's time, reduces the possibility of human error, reduces the need for customer support, and reduces costs.

Table I illustrates various ACPI APIC tables that can be created using the present invention. Table II illustrates various MP APIC tables from which the ACPI APIC tables are created. Table II comprises, in one embodiment, a plurality of entries. Each entry includes an entry type designator that identifies it as an entry for a processor, a bus, or an interrupt, for example. Each entry typically will also include additional information for that particular entry. As explained herein, the ACPI entries shown in Table I were built from and correspond to various MP entries shown in Table II.

TABLE I

ACPI APIC Tables
APIC - Multiple APIC Description Table

| | |
|---|---|
| Signature | :APIC |
| Length | :0000005C |
| Revision | :00000001 |
| Checksum | :00000033 |
| OEM ID | :PTLT |
| OEM Table ID | : APIC |
| OEM Revision | :00000000 |
| Creator ID | : LTP |
| Creator revision | :00000000 |
| Local Apic Address | :FEE00000 |
| Flags | :00000001 |
| Interrupt Source Overrides | |
| Type | :00000002 |
| Length | :0000000A |
| Bus | :00000000 |
| Source | :00000000 |
| System Interrupt Vector | :00000002 |
| Flags | :00000005 |
| IO APIC Structure | |
| Type | :00000001 |
| Length | :0000000C |
| IO APIC ID | :00000002 |
| Reserved | :00000000 |
| IO APIC Address | :FEC00000 |
| System Vector Base | :00000000 |
| Processor Local APIC Structure | |
| Type | :00000000 |
| Length | :00000008 |
| Processor ID | :00000001 |
| APIC ID | :00000000 |
| Flags | :00000001 |
| Processor Local APIC Structure | |
| Type | :00000000 |
| Length | :00000008 |
| Processor ID | :00000000 |
| APIC ID | :00000001 |
| Flags | :00000001 |

TABLE II

MP APIC Tables

| | |
|---|---|
| Type | : PCMP |
| Table Length | : 010Ch |
| Spec Revision | : 04h |
| Checksum | : DCh |
| OEM ID | : HP |
| Product ID | : XU/XW |
| OEM Config Tables | : 00000000h |
| OEM Table Size | : 0000h |
| Number of Entries | : 0019h |
| Local APIC Addr | : FEE00000h |
| Extended Table Len | : 0090h |
| Extended Table Checksum | : DBh |
| Reserved | : 00h |
| Processor Entry: | |
| Entry Type | : 00h |
| Local APIC ID | : 01h |
| Local APIC Version | : 11h |
| CPU Flags | : 03h |
| CPU Stepping/Model | : 33h |
| CPU Family | : 06h |
| Reserved #1 | : 0000h |
| Feature Flags | : 0080FBFFh |
| Reserved #2 | : 0000h |
| Reserved #3 | : 0000h |

TABLE II-continued

MP APIC Tables

Processor Entry:

| | |
|---|---|
| Entry Type | : 00h |
| Local APIC ID | : 00h |
| Local APIC Version | : 11h |
| CPU Flags | : 01h |
| CPU Stepping/Model | : 33h |
| CPU Family | : 06h |
| Reserved #1 | : 0000h |
| Feature Flags | : 0080FBFFh |
| Reserved #2 | : 0000h |
| Reserved #3 | : 0000h |

Bus Entry:

| | |
|---|---|
| Entry Type | : 01h |
| Bus ID | : 00h |
| Bus Name | : PCI |

Bus Entry:

| | |
|---|---|
| Entry Type | : 01h |
| Bus ID | : 01h |
| Bus Name | : PCI |

Bus Entry:

| | |
|---|---|
| Entry Type | : 01h |
| Bus ID | : 02h |
| Bus Name | : ISA |

I/O APIC Entry:

| | |
|---|---|
| Entry Type | : 02h |
| I/O APIC ID | : 02h |
| I/O APIC Version # | : 11h |
| I/O APIC Flags | : 01h |
| I/O APIC Address | : FEC00000h |

I/O Interrupt Entry:

| | |
|---|---|
| Entry Type | : 03h |
| Interrupt Type | : 03h (ExtINT) |
| Polarity/Trigger | : 0005h (POL=Active High / TRIG=Edge) |
| Source Bus Id | : 02h |
| Source Bus IRQ | : 00h |
| Dest I/O APIC Id | : 02h |
| Dest I/O APIC INTIN# | : 00h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 01h |
| Dest I/O APIC Id | : 02h |
| Dest I/O APIC INTIN# | : 01h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 00h |
| Dest I/O APIC Id | : 02h |
| Dest I/O APIC INTIN# | : 02h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 03h |
| Dest I/O APIC Id | : 02h |
| Dest I/O APIC INTIN# | : 03h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 04h |
| Dest I/O APIC Id | : 02h |
| Dest I/O APIC INTIN# | : 04h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 05h |
| Dest I/O APIC Id | : 02h |
| Dest I/O APIC INTIN# | : 05h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 06h |
| Dest I/O APIC Id | : 02h |
| Dest I/O APIC INTIN# | : 06h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 07h |
| Dest I/O APIC Id | : 02h |
| Dest I/O APIC INTIN# | : 07h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 08h |
| Dest I/O APIC Id | : 02h |
| Dest I/O APIC INTIN# | : 08h |

I/O Interrupt Entry:

| | |
|---|---|
| Entry Type | : 03h |
| Interrupt Type | : 00h (INT) |
| Polarity/Trigger | : 000Fh (POL=Active Low / TRIG=Level) |
| Source Bus Id | : 00h |
| Source Bus IRQ | : 40h |
| Dest I/O APIC Id | : 02h |
| Dest I/O APIC INTIN# | : 11h |

I/O Interrupt Entry:

| | |
|---|---|
| Entry Type | : 03h |
| Interrupt Type | : 00h (INT) |
| Polarity/Trigger | : 00Fh (POL=Active Low / TRIG=Level) |
| Source Bus Id | : 00h |
| Source Bus IRQ | : 20h |
| Dest I/O APIC Id | : 02h |
| Dest I/O APIC INTIN# | : 10h |

I/O Interrupt Entry:

| | |
|---|---|
| Entry Type | : 03h |
| Interrupt Type | : 00h (INT) |
| Polarity/Trigger | : 000Fh (POL=Active Low / TRIG=Level) |
| Source Bus Id | : 00h |
| Source Bus IRQ | : 1Fh |
| Dest I/O APIC Id | : 02h |
| Dest I/O APIC INTIN# | : 13h |

I/O Interrupt Entry:

| | |
|---|---|
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 0Ch |
| Dest I/O APIC Id | : 02h |
| Dest I/O APIC INTIN# | : 0Ch |

I/O Interrupt Entry:

| | |
|---|---|
| Entry Type | : 03h |

TABLE II-continued

MP APIC Tables

| | |
|---|---|
| Interrupt Type | : 00h (INT) |
| Polarity/Trigger | : 0005h (POL=Active High / TRIG=Edge) |
| Source Bus Id | : 02h |
| Source Bus IRQ | : 0Dh |
| Dest I/O APIC Id | : 02h |
| Dest I/O APIC INTIN# | : 0Dh |
| I/O Interrupt Entry: | |
| | |
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 0Eh |
| Dest I/O APIC Id | : 02h |
| Dest I/O APIC INTIN# | : 0Eh |
| I/O Interrupt Entry: | |
| | |
| Entry Type | : 03h |
| Interrupt Type | : 00h (INT) |
| Polarity/Trigger | : 0005h (POL=Active High / TRIG=Edge) |
| Source Bus Id | : 02h |
| Source Bus IRQ | : 0Fh |
| Dest I/O APIC Id | : 02h |
| Dest I/O APIC INTIN# | : 0Fh |
| I/O Interrupt Entry: | |
| | |
| Entry Type | : 03h |
| Interrupt Type | : 00h (INT) |
| Polarity/Trigger | : 000Fh (POL=Active Low / TRIG=Level) |
| Source Bus Id | : 00h |
| Source Bus IRQ | : 24h |
| Dest I/O APIC Id | : 02h |
| Dest I/O APIC INTIN# | : 13h |
| Local Interrupt Entry: | |
| | |
| Entry Type | : 04h |
| Interrupt Type | : 03h (ExtINT) |
| Polarity/Trigger | : 0005h (POL=Active High / TRIG=Edge) |
| Source Bus Id | : 02h |
| Source Bus IRQ | : 00h |
| Dest Local APIC Id | : FFh |
| Dest Local APIC INTIN# | : 00h |
| Local Interrupt Entry: | |
| | |
| Entry Type | : 04h |
| Interrupt Type | : 01h (NMI) |
| Polarity/Trigger | : 0005h (POL=Active High / TRIG=Edge) |
| Source Bus Id | : 00h |
| Source Bus IRQ | : 00h |
| Dest Local APIC Id | : FFh |
| Dest Local APIC INTIN# | : 01h |

Creation of the ACPI APIC entries occurs during the power on self test (POST) procedure which is performed upon turning on or resetting the computer. Referring to the flowchart of FIG. 1, in the method and computer system of the present invention, entry is made from the POST procedure at step 100. It is assumed that, by this point in the POST procedure, any requisite MP type entries have been built. Such entries may comprise, by way of example, processor entries, bus entries, I/O APIC entries, I/O interrupt entries and local interrupt assignment entries. In step 200, a search is made for the header for the MP APIC entries. Step 200 comprises other steps which are described in detail with reference to FIG. 2. If it is determined in step 280 that the MP APIC header is not found, in step 290, exit is made back to the POST procedure. If the MP APIC header was found, the procedure continues. In step 300 the MP APIC entries are scanned and ACPI APIC entries corresponding to at least a portion of the MP APIC entries are built in the computer memory. Step 300 comprises other steps which are described in detail with reference to FIG. 3. In step 400 the ACPI APIC header information is updated to reflect the newly built ACPI APIC entries. Step 400 comprises other steps which are described in detail with reference to FIG. 4. In step 500, exit is made back to the POST procedure.

Figure 2:
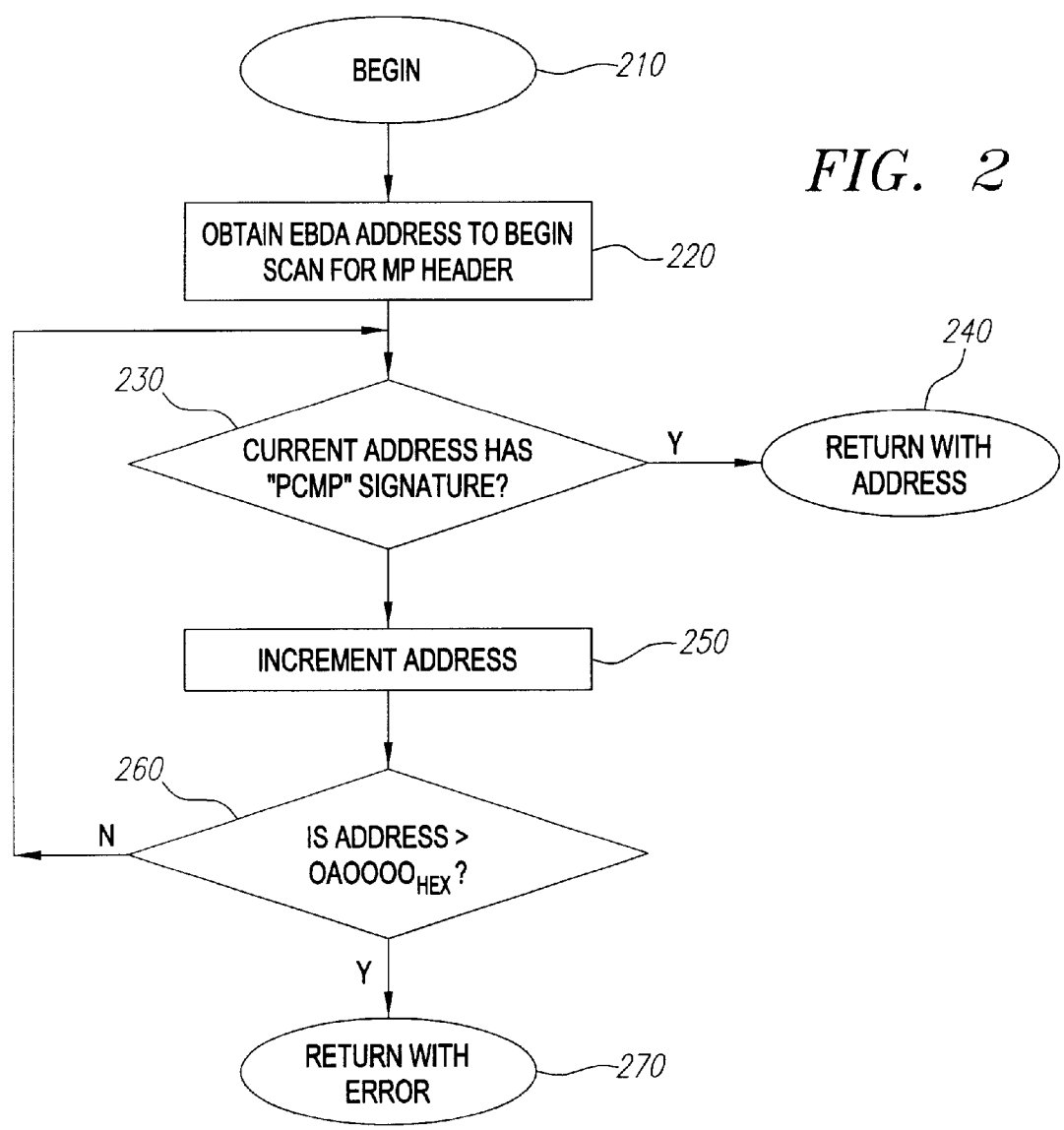
FIG. 2 is A flowchart illustrating the operation of the present invention in locating the MP APIC header in the memory of computer.

FIG. 2 illustrates the operation of the present invention in locating the MP APIC header in the memory of the computer. A typical MP APIC header is shown in Table II as the first block of information. This type of header includes a signature ("PCMP") and contains such information as the number of entries in the APIC table, the table length, the checksum and the memory address for where the APIC entries are located. After operation begins in step 210, the system, in step 220, obtains the Extended BIOS Data Area (EBDA) memory address which corresponds to the location in memory from where the search for the MP APIC header will be conducted. In step 230, it is determined whether or not the current address contains the "PCMP" signature which would indicate the presence of the MP APIC header. If it is determined that the PCMP signature is found, in step 240 a return is made to the operation shown in FIG. 1 and step 280 is performed. If, in step 230, it is determined that the current address location does not contain the PCMP signature, the address is incremented in step 250 and the process is repeated. The search, however, does not continue indefinitely. In a preferred embodiment of the invention, only memory locations up to a predetermined address are searched. In step 260, after the address has been incremented, a check is made to determine whether the address is above the predetermined address, $0A0000_{hex}$ in the preferred embodiment. If it is above the predetermined address, the search is halted and an error condition is returned, in step 270, to the operation shown in FIG. 1.

Figure 3:
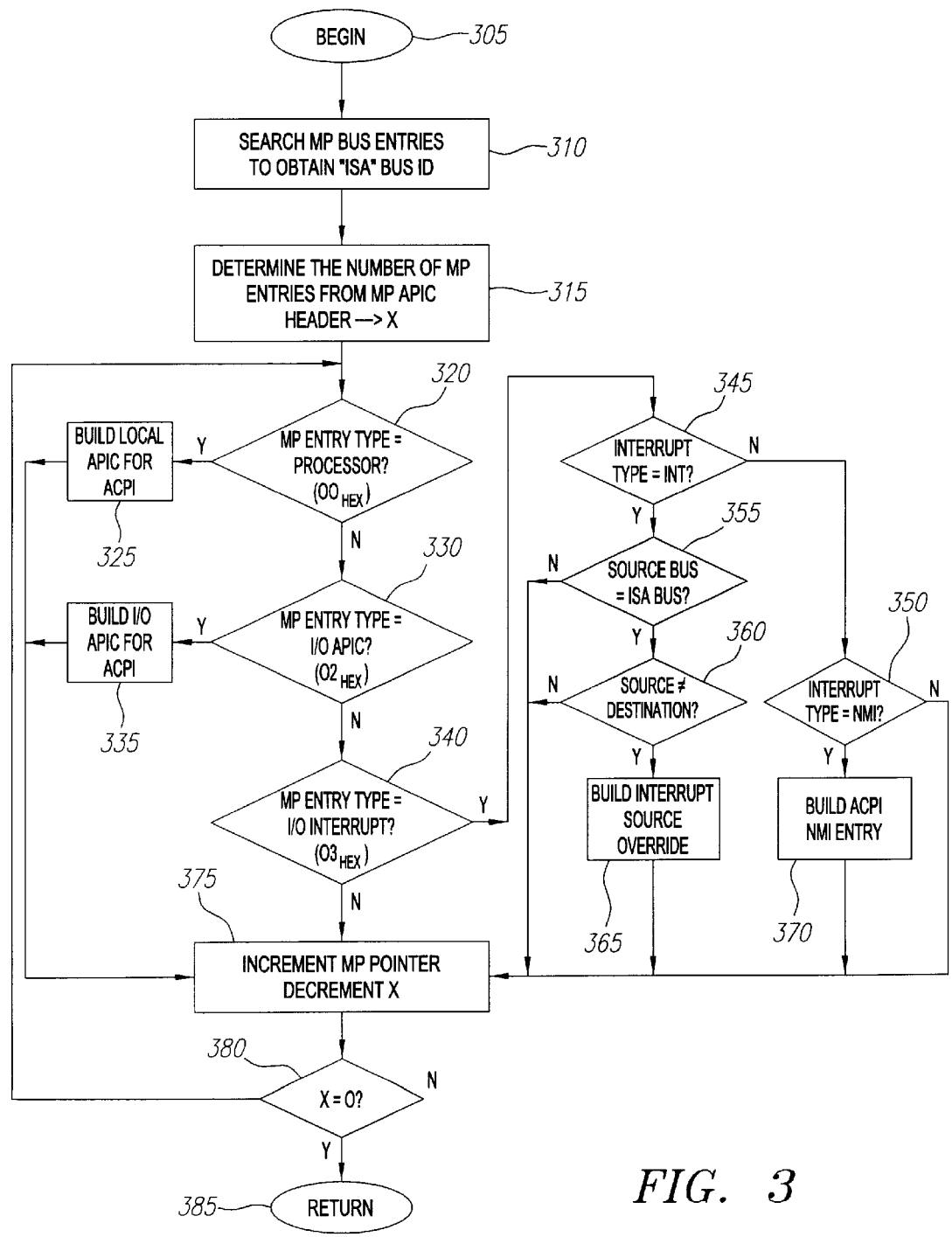
FIG. 3 is a flowchart illustrating the operation of the present invention in building ACPI APIC entries in the computer memory based upon MP APIC entries.

FIG. 3 illustrates the operation of the present invention in building ACPI APIC entries in the computer memory based upon MP APIC entries. As shown in Table II, there are various types of MP APIC entries. These types include processor entries ($00_{hex}$ in the entry type line), bus entries ($01_{hex}$ in the entry type line), I/O APIC entries ($02_{hex}$ in the entry type line), I/O interrupt entries ($03_{hex}$ in the entry type line), and local interrupt assignment entries ($04_{hex}$ in the entry type line). Some of these types are used in the present invention to create ACPI APIC entries while other types are disregarded. Step 305 marks the beginning of the procedure whereupon in step 310 the MP Bus entries are searched to determine the Bus ID for the ISA bus. Referring to Table II, bus entries are identified with an entry type: $01_{hex}$. In the case of the tables shown in Table II, $02_{hex}$ is the Bus ID for the ISA bus. Next, in step 315, the total number of MP APIC entries is determined from the MP APIC header and is stored as a variable indicated as X. This variable will be used as a counter to ensure that the appropriate number of MP entries are evaluated. In the example shown in Table II, the number of entries is 25 ($19_{hex}$).

In step 320, execution goes to a designating starting entry in the MP table, and it is determined for a single MP entry, whether that entry is a processor entry ($00_{hex}$). This is typically listed in a particular line, like the first line of a given entry. If so, a corresponding ACPI Local APIC entry is built, in step 325, using the information contained in the MP processor entry. The building step may comprise, by way of example, creating and storing an ACPI entry containing information from the corresponding MP entry, but with the format of such information modified to compensate for structural differences between the tables. For example, the two entries in Table I labeled "Processor Local APIC Structure" were built from the two "Processor" entries shown in Table II. Then, in step 375, the pointer is incremented to the next entry, the variable X is decremented and the process is repeated for the next entry in the MP table. If, however, X is equal to zero, as determined in step 380, it is assumed that the last MP entry has been evaluated and a return is made to the procedure shown in FIG. 1. If, in step 320, it is determined that the entry is not a processor entry, then step 330 is performed.

In step 330, it is determined whether the entry is an I/O APIC entry ($02_{hex}$). If so, a corresponding ACPI I/O APIC entry is built, in step 335, using the information contained in the MP I/O APIC entry. For example, the entry labeled "IO APIC Structure" in Table I was built from the "I/O APIC" entry of Table II. Then, in step 375, the pointer is incremented to the next entry, the variable X is decremented and the process is repeated for the next entry. If, however, X is equal to zero, as determined in step 380, it is assumed that the last MP entry has been evaluated and a return is made to the procedure shown in FIG. 1. If, in step 330, it is determined that the entry is not an I/O APIC entry, then step 340 is performed.

In step 340, it is determined whether the entry is an I/O Interrupt entry ($03_{hex}$). If not, evaluation of that MP entry is substantially complete and the system proceeds to step 375. In step 375, the pointer is incremented to the next entry, the variable X is decremented and the process is repeated for the next entry. If, however, X is equal to zero, as determined in step 380, it is assumed that the last MP entry has been evaluated and a return is made to the procedure shown in FIG. 1. If, in step 340, it is determined that the entry is an I/O Interrupt entry, then step 345 is performed.

In step 345, it is determined whether the interrupt type of the I/O Interrupt entry is a maskable interrupt (INT); such an interrupt type would be indicated by $00_{hex}$. If so, then the operation proceeds to step 355 and the process begins for building, if warranted, an interrupt source override. If not, then the operation proceeds to step 375 and continues as described above. In step 355, it is determined whether the source bus for that entry is the ISA bus based upon a comparison of the source bus ID and the ISA Bus ID determined in step 310. If so, the operation proceeds to step 360. If not, then the operation proceeds to step 375 and continues as described above.

In step 360, it is determined whether the source bus IRQ for the entry is different than the destination I/O APIC INTIN# (the input pin number for the I/O APIC) for the same entry. This would indicate the need for an interrupt source override to be built in the corresponding ACPI entry. Referring to Table II, such a condition exists in the case of the third I/O Interrupt entry shown in the table. There, the interrupt type is $00_{hex}$, the source bus ID is $02_{hex}$ which is the same as the ISA Bus, and the source bus IRQ of $00_{hex}$ is different than the destination I/O APIC INTIN# of $02_{hex}$. In such a case, step 365 is performed to build a corresponding ACPI Interrupt Source Override entry using the information contained in the MP I/O interrupt entry. For example, the corresponding entry in Table I is labeled "Interrupt Source Override." The operation then proceeds to step 375. In step 375, the pointer is incremented to the next entry, the variable X is decremented and the process is repeated for the next entry. If, however, X is equal to zero, as determined in step 380, it is assumed that the last MP entry has been evaluated and a return is made to the procedure shown in FIG. 1.

If, in step 345, it is determined that the interrupt type for the MP I/O interrupt entry is not $00_{hex}$ (i.e. not a maskable interrupt (INT)), then the operation proceeds to step 350 where it is determined whether the I/O Interrupt entry is a non-maskable interrupt (NMI); such an interrupt type would be indicated by $01_{hex}$. If so, then a corresponding ACPI NMI entry is built, in step 370, using the information contained in the MP I/O interrupt entry. If not, then the operation proceeds to step 375. In step 375, the pointer is incremented to the next entry, the variable X is decremented and the process is repeated for the next entry. If, however, X is equal to zero, as determined in step 380, it is assumed that the last MP entry has been evaluated and a return is made to the procedure shown in FIG 1.

Figure 4:
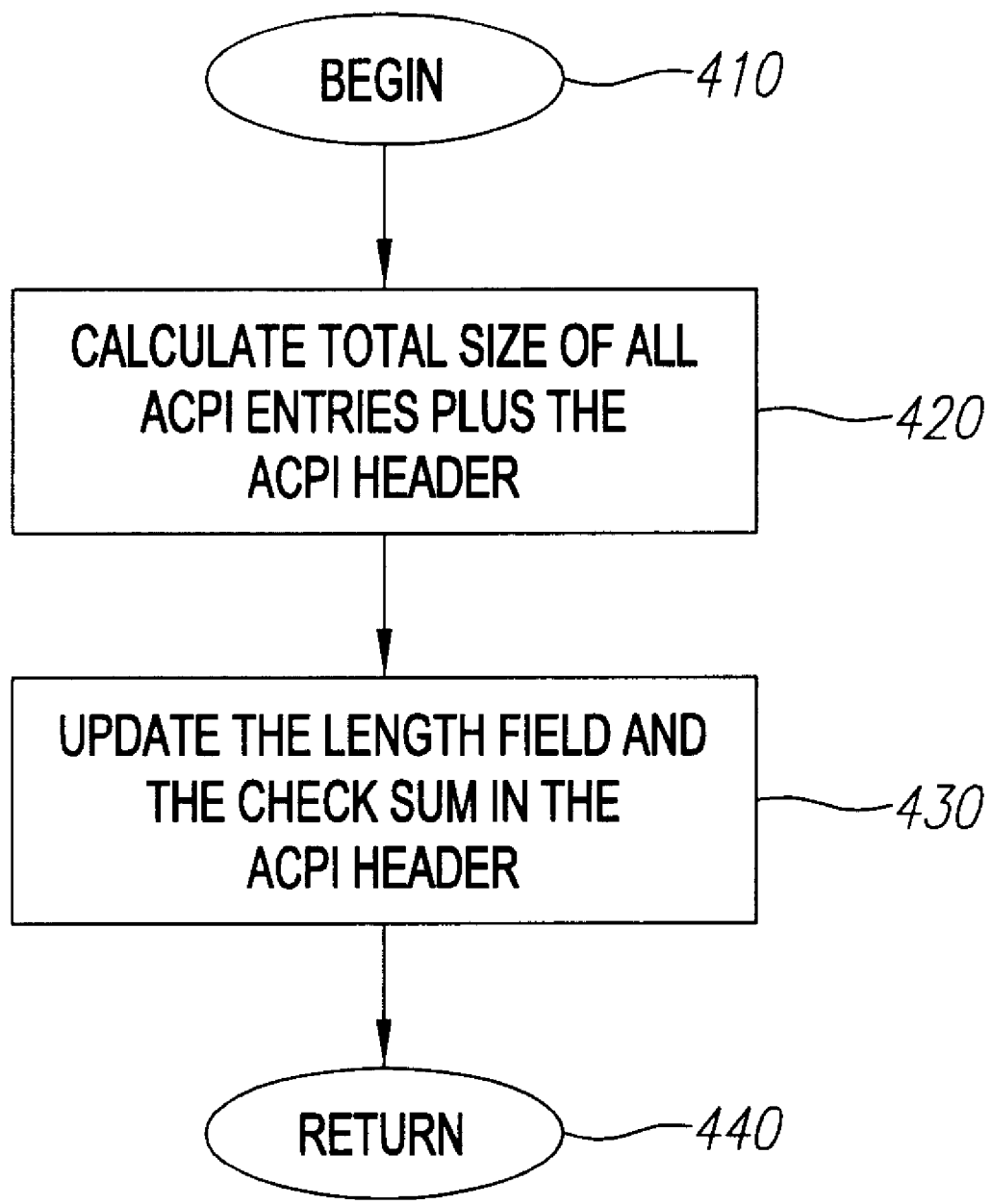
FIG. 4 is a flowchart illustrating the operation of the present invention in updating information in the ACPI APIC header.

FIG. 4 illustrates the operation of the present invention in updating the information in the ACPI APIC header. Step 410 marks the beginning of the procedure whereupon in step 420 the total size for all the ACPI APIC entries including the ACPI APIC header is calculated. Then, in step 430, the length field and the checksum in the ACPI APIC header are updated. Finally, in step 440, a return is made to the operation shown in FIG. 1 and step 500 is performed to return to and continue with the POST procedure.

In this way, the method and system of the present invention, which can be embodied on a computer readable medium, provide for dynamic creation of APIC tables under the ACPI specification using existing APIC tables under the MP specification in a multi-processor computer. This allows for ACPI APIC entries to be created accurately and efficiently with minimal involvement of the deployment engineer.

Reference is made herein to the use of a computer memory and the creation therein of various entries. It is intended, as would be apparent to one skilled in the art, that computer memory be construed to include any type of computer readable memory including memory of a computer and disk storage memory as well as single and multiple memories comprising overlapping and/or non-overlapping memory areas.

It is intended that the invention, as described herein, includes all variations and modifications as fall within the scope of the claims and equivalents thereof.

What is claimed is:

1. A method of dynamically creating APIC entries, said method comprising the steps of:

scanning a first computer readable memory area for an MP APIC header;

reading MP APIC entries from a location in a second computer readable memory area indicated by the MP APIC header;

building ACPI APIC entries in a third computer readable memory area from at least a portion of said MP APIC entries; and updating an ACPI APIC header in said third computer readable memory area.

2. A method of dynamically creating APIC entries as recited in claim 1, wherein said MP APIC header is located in an Extended BIOS Data Area address (EBDA) in said first computer readable memory area and comprises a PCMP signature and a pointer to an address in said second computer readable memory area where said MP APIC entries are located, said step of scanning said first computer readable memory area for said MP APIC header comprising:

searching address locations under a predetermined address in said first computer readable memory area for said PCMP signature;

obtaining the corresponding pointer contained in said MP APIC header when said PCMP signature is found; and generating an error indication when said PCMP signature is not found under said predetermined address in said first computer readable memory area.

3. A method of dynamically creating APIC entries as recited in claim 2, wherein said predetermined address in said first computer readable memory area is $0A0000_{hex}$.

4. A method of dynamically creating APIC entries as recited in claim 2, wherein said step of reading MP APIC entries flrher comprises reading said MP APIC entries starting from the address in said second computer readable memory area indicated by said pointer.

5. A method of dynamically creating APIC entries as recited in claim 1, said step of building ACPI APIC entries comprising:
   a) scanning said MP APIC entries to obtain an ISA bus ID;
   b) determining from said MP APIC header the total number of MP APIC entries;
   c) determining an MP entry type for one of said MP APIC entries;
   d) building, in said third computer readable memory area, a local ACPI APIC entry based upon the information in said MP APIC entry if said MP APIC entry is of a processor type;
   e) building, in said third computer readable memory area, an I/O ACPI APIC entry based upon the information in said MP APIC entry if said MP APIC entry is of an I/O APIC type;
   f) building, in said third computer readable memory area, an interrupt source override ACPI entry based upon the information in said MP APIC entry if said MP APIC entry is of an I/O interrupt type and is maskable, if a source bus ID of said MP APIC entry is equivalent to said ISA bus IRQ and if said source bus ID is different than a destination I/O APIC INTIN# of said MP APIC entry;
   g) building, in said third computer readable memory area, an ACPI NMI entry based upon the information in said MP APIC entry if said MP APIC entry is of an I/O interrupt type and is non-maskable; and
   h) performing steps c) through g) for each of said MP APIC entries.

6. A method of dynamically creating APIC entries as recited in claim 1, said step of building ACPI APIC entries comprising:
   a) scanning said MP APIC entries to obtain an ISA bus ID;
   b) determining an MP entry type for one of said MP APIC entries;
   c) building, in said third computer readable memory area, an interrupt source override ACPI entry based upon the information in said MP APIC entry if said MP APIC entry is of an I/O interrupt type and is maskable, if a source bus ID of said MP APIC entry is equivalent to said ISA bus IRQ and if said source bus ID is different than a destination I/O APIC INTIN# of said MP APIC entry;
   d) building, in said third computer readable memory area, an ACPI NMI entry based upon the information in said MP APIC entry if said MP APIC entry is of an I/O interrupt type and is non-maskable; and
   e) repeating steps b) and d) for another one of said MP APIC entries.

7. A method of dynamically creating APIC entries as recited in claim 1, said step of building ACPI APIC entries comprising:
   a) determining an MP entry type for one of said MP APIC entries;
   b) building, in said third computer readable memory area, a local ACPI APIC entry based upon the information in said MP APIC entry if said MP APIC entry is of a processor type;
   c) repeating steps a) and b) for another one of said MP APIC entries.

8. A method of dynamically creating APIC entries as recited in claim 1, said step of building ACPI APIC entries comprising:
   a) determining an MP entry type for one of said MP APIC entries;
   b) building, in said third computer readable memory area, an I/O ACPI APIC entry based upon the information in said MP APIC entry if said MP APIC entry is of an I/O APIC type;
   c) repeating steps a) and b) for another one of said MP APIC entries.

9. A method of dynamically creating APIC entries as recited in claim 1, said step of updating an ACPI APIC header comprising:
   calculating the total size of all ACPI APIC entries including said ACPI APIC header;
   updating a length field in said ACPI APIC header with said total size; and
   updating a checksum in said ACPI APIC header.

10. A method of dynamically creating APIC entries as recited in claim 1, wherein said steps are performed during one of a power on self test operation and a reset operation of a multi-processor computer comprising said first computer readable memory area.

11. A method of dynamically creating APIC entries as recited in claim 1 wherein a single memory comprises said first, second and third computer readable memory areas.

12. A multi-processor computer system in which APIC entries are dynamically created, said system comprising:
   a first computer readable memory area containing MP APIC entries including an MP APIC header;
   a processor for reading at least a portion of said MP APIC entries and building corresponding ACPI APIC entries in a second computer readable memory area based upon the information in said MP APIC entries.

13. A multi-processor computer system in which APIC entries are dynamically created as recited in claim 12, wherein said MP APIC header comprises:
   a PCMP signature; and
   a pointer to a location in said first computer readable memory area where said MP APIC entries are located.

14. A multi-processor computer system in which APIC entries are dynamically created as recited in claim 12, wherein said MP APIC entries comprise processor type, I/O APIC type and I/O interrupt type entries and wherein said ACPI APIC entries comprise local APIC type, I/O APIC type and interrupt source override type entries corresponding to the processor type, I/O APIC type and I/O interrupt type MP APIC entries.

15. A computer program product comprising a computer readable medium having computer readable code for causing dynamic creation of APIC entries, said computer readable code in said computer program product comprising:
   a first computer readable code for scanning a first computer readable memory area for an MP APIC header;
   a second computer readable code for reading MP APIC entries from a location in a second computer readable memory area indicated by the MP APIC header;
   a third computer readable code for building ACPI APIC entries in a third computer readable memory area from at least a portion of said MP APIC entries; and a fourth computer readable code for updating an ACPI APIC header in said third computer readable memory area.

16. A computer program product as recited in claim 15, wherein said MP APIC header is located in an Extended BIOS Data Area address (EBDA) in said first computer readable memory area and comprises a PCMP signature and a pointer to an address in said second computer readable memory area where said MP APIC entries are located, said first computer readable code comprising:

computer readable code for searching address locations under a predetermined address in said first computer readable memory area for said PCMP signature;

computer readable code for obtaining the corresponding pointer contained in said MP APIC header when said PCMP signature is found; and computer readable code for generating an error indication when said PCMP signature is not found under said predetermined address in said first computer readable memory area.

17. A computer program product as recited in claim 16, wherein said predetermined address in said first computer readable memory area is $0A0000_{hex}$.

18. A computer program product as recited in claim 16, wherein said second computer readable code finter comprises computer readable code for reading said MP APIC entries starting from the address in said second computer readable memory area indicated by said pointer.

19. A computer program product as recited in claim 15, said third computer readable code comprising:

a) computer readable code for scanning said MP APIC entries to obtain an ISA bus ID;

b) computer readable code for determining from said MP APIC header the total number of MP APIC entries;

c) computer readable code for determining an MP entry type for one of said MP APIC entries;

d) computer readable code for building, in said third computer readable memory area, a local ACPI APIC entry based upon the information in said MP APIC entry if said MP APIC entry is of a processor type;

e) computer readable code for building, in said third computer readable memory area, an I/O ACPI APIC entry based upon the information in said MP APIC entry if said MP APIC entry is of an I/O APIC type;

f) computer readable code for building, in said third computer readable memory area, an interrupt source override ACPI entry based upon the information in said MP APIC entry if said MP APIC entry is of an I/O interrupt type and is maskable, if a source bus ID of said MP APIC entry is equivalent to said ISA bus IRQ and if said source bus ID is different than a destination I/O APIC INTIN# of said MP APIC entry;

g) computer readable code for building, in said third computer readable memory area, an ACPI NMI entry based upon the information in said MP APIC entry if said MP APIC entry is of an I/O interrupt type and is non-maskable; and h) computer readable code for repeating the computer readable codes of c) through g) for each of said MP APIC entries.

20. A computer program product as recited in claim 15, said third computer readable code comprising:

a) computer readable code for scanning said MP APIC entries to obtain an ISA bus ID;

b) computer readable code for determining an MP entry type for one of said MP APIC entries;

c) computer readable code for building, in said third computer readable memory area, an interrupt source override ACPI entry based upon the information in said MP APIC entry if said MP APIC entry is of an I/O interrupt type and is maskable, if a source bus ID of said MP APIC entry is equivalent to said ISA bus IRQ and if said source bus ID is different than a destination I/O APIC INTIN# of said MP APIC entry;

d) computer readable code for building, in said third computer readable memory area, an ACPI NMI entry based upon the information in said MP APIC entry if said MP APIC entry is of an I/O interrupt type and is non-maskable; and e) computer readable code for repeating the computer readable codes of b) and d) for another one of said MP APIC entries.

21. A computer program product as recited in claim 15, said third computer readable code comprising:

a) computer readable code for determining an MP entry type for one of said MP APIC entries;

b) computer readable code for building, in said third computer readable memory area, a local ACPI APIC entry based upon the information in said MP APIC entry if said MP APIC entry is of a processor type; and c) computer readable code for repeating the computer readable codes of a) and b) for another one of said MP APIC entries.

22. A computer program product as recited in claim 15, said third computer readable code comprising:

a) computer readable code for determining an MP entry type for one of said MP APIC entries;

b) computer readable code for building, in said third computer readable memory area, an I/O ACPI APIC entry based upon the information in said MP APIC entry if said MP APIC entry is of an I/O APIC type;

c) computer readable code for repeating the computer readable codes of a) and b) for another one of said MP APIC entries.

23. A computer program product as recited in claim 15, said fourth computer readable code comprising:

computer readable code for calculating the total size of all ACPI APIC entries including said ACPI APIC header;

computer readable code for updating a length field in said ACPI APIC header with said total size; and computer readable code for updating a checksum in said ACPI APIC header.

24. A computer program product as recited in claim 14 wherein a single memory comprises said first, second and third computer readable memory areas.

* * * * *